United States Patent
Ma et al.

(10) Patent No.: US 8,973,089 B2
(45) Date of Patent: Mar. 3, 2015

(54) SECURE SOCKET POLICY FILES FOR ESTABLISHING SECURE SOCKET CONNECTIONS

(75) Inventors: Magnus H. Ma, San Francisco, CA (US); Rajesh K. Gwalani, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 613 days.

(21) Appl. No.: 13/205,514

(22) Filed: Aug. 8, 2011

(65) Prior Publication Data

US 2014/0304763 A1 Oct. 9, 2014

(51) Int. Cl.
*H04L 29/06* (2006.01)
*G06F 21/00* (2013.01)

(52) U.S. Cl.
CPC ....... *H04L 63/0263* (2013.01); *H04L 29/06965* (2013.01)
USPC ................................................. 726/1; 726/14

(58) Field of Classification Search
CPC .............. H04L 63/0263; H04L 63/205; H04L 29/06965
See application file for complete search history.

(56) References Cited

U.S. PATENT DOCUMENTS

| 5,822,434 | A * | 10/1998 | Caronni et al. | 713/156 |
|---|---|---|---|---|
| 7,174,565 | B2 * | 2/2007 | Kadyk et al. | 726/12 |
| 7,370,351 | B1 * | 5/2008 | Ramachandran et al. | 726/8 |
| 7,984,170 | B1 * | 7/2011 | Shalla et al. | 709/229 |
| 8,117,325 | B1 * | 2/2012 | Wu | 709/229 |
| 8,195,818 | B2 * | 6/2012 | Srinivasan et al. | 709/229 |
| 8,359,605 | B2 * | 1/2013 | Ross | 719/328 |
| 8,539,545 | B2 * | 9/2013 | Kartha et al. | 726/1 |
| 8,689,099 | B1 * | 4/2014 | Hanni et al. | 715/234 |
| 2006/0195899 | A1 * | 8/2006 | Ben-Shachar et al. | 726/12 |
| 2008/0066148 | A1 * | 3/2008 | Lim | 726/1 |
| 2008/0209538 | A1 * | 8/2008 | Malakapalli et al. | 726/12 |
| 2010/0180284 | A1 * | 7/2010 | Ross | 719/330 |

OTHER PUBLICATIONS

Uhley, "Setting up a Socket Policy File Server," Archived on Apr. 22, 2006, Adobe-Developer Center, p. 1-5, retrieved from https://web.archive.org/web/20080422054816/http://www.adobe.com/devnet/flashplayer/articles/socket_policy_files.html?*

Kira, "Setting Up a Flash Socket Policy File," Archived on May 5, 2008, Kira's Web Toolbox, pp. 1-2, retrieved from https://web.archive.org/web/20080505053657/http://www.lightsphere.com/dev/articles/flash_socket_policy.html.*

(Continued)

*Primary Examiner* — Jung Kim
*Assistant Examiner* — James J Wilcox
(74) *Attorney, Agent, or Firm* — Kilpatrick Townsend & Stockton LLP

(57) ABSTRACT

Exemplary embodiments involve a computing system requesting and receiving a socket policy file from a policy file server via a secure socket connection, identifying that the security policy requires communicating with a content server via a secure socket connection, and communicating with the content server via a second secure socket connection. The socket policy file specifies a security policy governing socket connections to a content server over a transport protocol layer. Additional embodiments involve requesting a socket policy file via a non-secure socket connection, receiving (via the non-secure socket connection) a placeholder socket policy file requiring requests for socket policy files to be communicated via a secure socket connection, establishing a secure socket connection with the policy file server, and submitting a request for the socket policy file to the policy file server via the secure socket connection.

13 Claims, 5 Drawing Sheets

(56) References Cited

OTHER PUBLICATIONS

Flash 8 Action Script 2.0 Language Reference, pp. 1-8, Archived on Mar. 21, 2009, Brajeshwar.com, retrieved from https://web.archive.org/web/20090321150025/http://docs.brajeshwar.com/as2/XMLSocket.html#close().*

Holgate, "Socket Connection Termination," pp. 1-2, Apr. 28, 2008, Retrieved from http://www.lenholgate.com/blog/2008/04/socket-connection-termination.html.*

Adobe Flex 4"Using Flex 4/Application Architecture/Security," retrieved from https://web.archive.org/web/20100509215813/http://help.adobe.com/en_US/flex/using/WS2db454920e96a9e51e63e3d11c0bf6167e-7fe9.html, May 9, 2010, pp. 1-2.*

Adobe Flash Platform, "Home/ActionScript 3.0 Developer's Guide/Security," retrieved from https://web.archive.org/web/20100616131327/http://help.adobe.com/en_US/as3/dev/WS5b3ccc516d4fbf351e63e3d118a9b90204-7c60.html, Jun. 16, 2010, pp. 1-3.*

* cited by examiner

SECURE SOCKET POLICY FILES FOR ESTABLISHING SECURE SOCKET CONNECTIONS

TECHNICAL FIELD

This disclosure relates generally to computer software and more particularly relates to establishing secure socket connections using secure socket policy files.

BACKGROUND

Network domains are logical groups of devices connected to a computer network used to identify the device in various forms of electronic communication such as the Internet, e-mail, etc. Electronic content hosted from a computing system on a first Internet domain, such as a streaming media server, can execute other electronic content from electronic content providers, such as advertisement servers, hosted on a second Internet domain. Servers in different network domains can communicate via transport layer socket connections.

Cross-domain communication between a computing system hosting electronic content, such as an application, on a first domain and a content provider hosting other electronic content on a second domain can be controlled using socket policy files. Socket policy files can specify the domains from which an electronic content provider will permit the establishment of socket connections. An application hosted by a system in a first domain that requests electronic content hosted by a content provider in a second domain can first request a socket policy file from the content provider domain. If the security policy specified in the socket policy file permits connections from the first domain, the application can retrieve electronic content from the content provider domain.

Non-secure socket connections allow non-encrypted or otherwise unsecured data to be transmitted between a system on a first domain and a content provider on a second domain. Additional measures for cross-domain communication may be required to secure communications between the system and the content provider.

SUMMARY

Systems and methods for establishing secure socket connections using secure socket policy file are disclosed. An exemplary embodiment involves a computing system requesting a socket policy file from a policy file server via a first secure socket connection. The socket policy file specifies a security policy governing socket connections to the policy file server over a transport protocol layer. The computing system can receive the socket policy file via the first secure socket connection. The computing system can identify that the security policy requires communication with a content server via a second secure socket connection. The computing system can communicate with the content server via the second secure socket connection. The policy file server and content server can be comprised in a single server system or in different server systems hosted on a common network domain.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
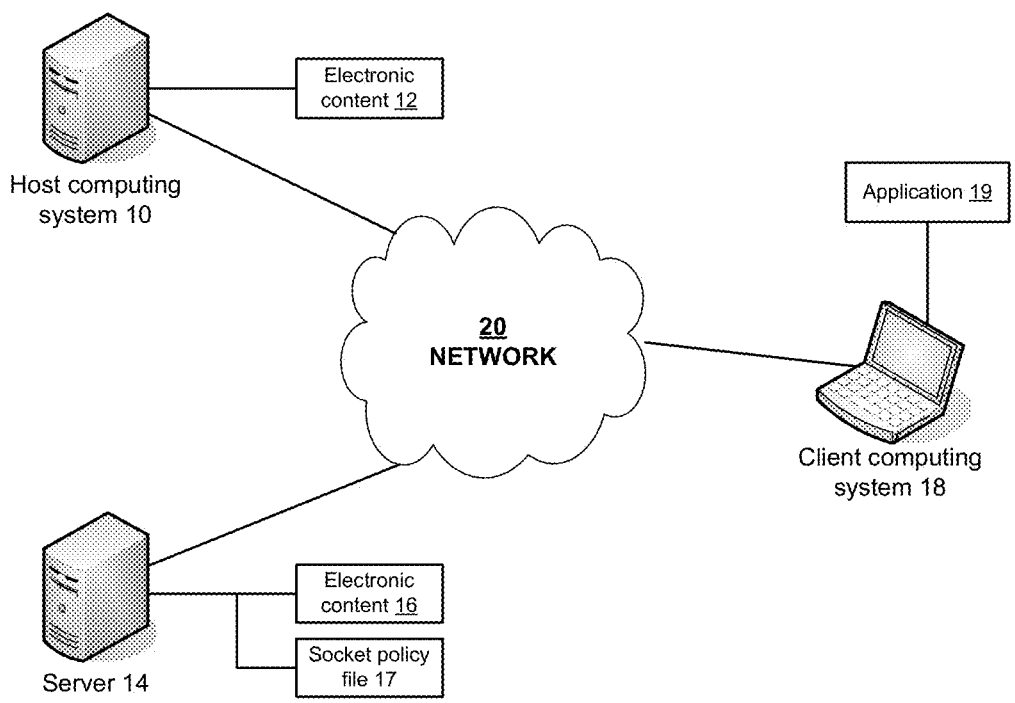
FIG. 1 is a network diagram illustrating a computing system hosting electronic content and a server hosting additional electronic content used by the electronic content hosted at the computing system.

Systems and methods are provided that establish a secure socket connection for communicating content based on a socket policy file that is itself communicated using a secure socket connection. The secured communication specified by the socket policy file may decrease vulnerability to interception by a third party, reduce the risk of security breaches, and provide various other benefits in cross-domain communications.

An application or other electronic content executed at a computing system can cause the computing system to request a socket policy file from a policy file server via a first secure socket connection. The secure nature of the socket connection can protect the socket policy file from interception and modification by a third party on the network between domains, thereby preserving the security of cross-domain communications. The socket policy file can specify a security policy governing socket connections from the computing system to a content server over a transport protocol layer. The computing system can receive the socket policy file via the first secure socket connection and identify that the security policy requires communication with the content server via a second secure socket connection. The computing system can then establish a second secure socket connection to communicate with the content server.

As used herein, the term "computing system" is used to refer to a computing system located on a first domain and hosting electronic content such as (but not limited to) an application that can access additional electronic content hosted by content providers located on other domains. For example, electronic content hosted at a computing system may be a streaming media file that, when executed, accesses additional media content, such as an advertisement, hosted at a second domain. In additional or alternative embodiments, the electronic content hosted at the computing system can be accessed via a network by a client computing system.

As used herein, the term "client computing system" is used to refer to a computing system that can access an application or other electronic content hosted at a computing system on a first domain via a network.

As used herein, the term "policy file server" is used to refer to a computing system, such as a server, that includes a policy file server application for providing socket policy files.

As used herein, the term "content server" is used to refer to a computing system providing electronic content. Examples of electronic content can include, but are not limited to, video files, audio files, image files, text files, other applications, etc.

As used herein, the term "socket connection" is used to refer to a bi-directional network communication channel established at the transport protocol layer between a port at a first computing device, such as a host, and a port at a second computing device, such as a server.

As used herein, the term "port" is used to refer to a software construct used as an endpoint for a communication channel by an operating system of a computing system. Applications hosted on a computing system can access data addressed to the port. For example, the operating system of a computing system can address packetized data to a specific port on a server by including a port number identifying the destination port in the header of each data packet transmitted to the server. When the server receives the addressed data packets, the operating system of the server can route the data packets to the port that is the endpoint for the socket connection. An application, such as a policy file server application, can access data packets addressed to the port.

As used herein, the term "socket policy file" is used to refer to a file that can specify a security policy for a socket connection. Socket policy files can be created using a programming language such as, but not limited to, Extensible Markup Language (XML). The security policy can specify which domains can communicate with a content provider domain and which ports can be used for socket connections with the content provider domain. The socket policy file can also specify that cross-domain socket connections must be secure socket connections.

As used herein, the term "secure socket connection" is used to refer to a socket connection using a transport layer security protocol.

As used herein, the term "transport protocol layer" is used to refer to a network protocol layer for host-to-host network communication. Examples of transport protocol layer protocols include, but are not limited to, the Transmission Control Protocol (TCP) and the User Datagram Protocol (UDP).

As used herein, the term "transport layer security protocol" is used to refer to a protocol for securing the communication of packetized data at the transport protocol layer. Examples of transport layer security protocols include, but are not limited to, Transport Layer Security (TLS) and Secure Sockets Layer (SSL).

The following example illustrates how a computing system may establish a secure socket connection using a secure socket policy file to request electronic content from a content server. Electronic content, such as an application, may be hosted on a computing system and be accessed via the Internet. The computing system may be a server system hosted on a first domain (e.g., hostdomain.tld). The application may receive a command to execute additional electronic content, such as a video file, that is located on a content provider hosted on a second domain (e.g., contentdomain.tld). To retrieve the additional electronic content from the content provider on the second domain, the computing system may establish a first secure socket connection with a policy file server hosted at contentdomain.tld. The first secure socket connection may be established according to the transport layer security protocol. The computing system may retrieve a socket policy file from the policy file server. The socket policy file may specify that hostdomain.tld must communicate with contentdomain.tld using a secure socket connection. The computing system may establish a second secure socket connection with a content server at contentdomain.tld. The computing system may retrieve the electronic content via the second secure socket connection. The application can then access and use the electronic content retrieved by the computing system. If, however, the security policy specified in the socket policy file does not permit connections from hostdomain.tld, the content provider can deny access to the computing system.

As discussed in the above example, a socket policy file can specify a security policy governing socket connections between different domains. The security policy can identify one or more domains from which a computing system is required to communicate using a secure socket connection. The security policy can also identify one or more domains from which a computing system can communicate via a non-secure socket connection. For example, a socket policy file governing communications with contentdomain.tld can specify that securehost.tld and nonsecurehost.tld can communicate with contentdomain.tld. The socket policy file for contentdomain.tld can further specify that securehost.tld must communicate using a secure socket connection and nonsecurehost.tld can communicate using a non-secure socket connection. Accordingly, if a computing system at securehost.tld attempts to establish a non-secure socket connection with a content provider at contentdomain.tld, the content provider can deny access to the computing system.

Requesting the socket policy file via the secure socket connection can additionally or alternatively include using a placeholder socket policy file. As used herein, the term "placeholder socket policy file" is used to refer to a socket policy file provided via a non-secure socket connection directing that a computing system must retrieve a socket policy file over a secure socket connection. A computing system can establish an initial socket connection with the policy file server that is a non-secure socket connection. The computing system can request a socket policy file via the non-secure socket connection. The computing system can receive a placeholder socket policy file via the non-secure socket connection. The placeholder socket policy file can specify that socket policy files must be requested via a secure socket connection. The computing system can establish the first secure socket connection with the policy file server. The computing system can request the socket policy file from the policy file server via the first secure socket connection.

In additional or alternative embodiments, the placeholder socket policy file can specify the domains from a computing system can request a socket policy file. If the computing system is not located at a domain specified in the placeholder socket policy file, the policy file server may deny requests for the socket policy file from the computing system.

In one embodiment, the policy file server and the content server can be comprised in a single server system. In another embodiment, the policy file server can be a first server system and the content server can be a second server system, where the first server system and the second server system can be hosted on a common network domain.

In one embodiment, the computing system can request the security policy and retrieve electronic content using a common port. The computing system can establish a first secure socket connection for receiving a socket policy file from the policy file server using a port. The port can be an endpoint of a socket connection for communicating with the policy file server. The computing system can terminate the first secure socket connection upon receiving the socket policy file. The computing system can establish a second secure socket connection for communicating with the content server using the same port.

In another embodiment, the computing system can request the security policy and retrieve electronic content using different ports. The computing system can establish a first secure socket connection for receiving a socket policy file from the policy file server using a first port. The computing system can terminate the first secure socket connection upon receiving the socket policy file. The computing system can establish a second secure socket connection for communicating with the content server using a second port.

In one embodiment, the computing system can establish the first and second secure socket connections to different server systems hosted at a common domain. For example, the content server (e.g., ContentServer) and socket policy file server (PolicyFileServer) can be hosted at contentdomain.tld. The computing system can communicate data packets, such as socket policy requests, addressed to "PolicyFileServer.contentserver.tld" via a first secure socket connection. The computing system can communicate data packets, such as requests for electronic content, addressed to "ContentServer.contentserver.tld" via a second secure socket connection. In another embodiment, a single system hosted at contentdomain.tld can function as both a policy file server and a socket policy file server.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating a computing system 10 hosting electronic content 12 and a server 14 hosting additional electronic content 16 used by the electronic content 12 hosted at the computing system 10.

The computing system 10 can be located on a first domain. The computing system can include, but is not limited to, a server system, a cloud computing system, and/or a grid computing system. The first domain can be a network domain accessible via network 20. The computing system 10 can host the electronic content 12. The electronic content 12 can include, but is not limited to, video files, image files, audio files, Internet applications, etc.

The computing system 10 can communicate with the server 14 via a network 20. The server 14 can include, but is not limited to, a server system, a cloud computing system, and/or a grid computing system. The server 14 can be located at a content domain. The content domain can be a network domain accessible via network 20. The server 14 can host the additional electronic content 16. The additional electronic content 16 can include, but is not limited to, video files, image files, audio files, plug-ins, etc.

The electronic content 12 can configure the computing system 10 to access the additional electronic content 16 hosted by the server 14. For example, if the electronic content 12 is a video file hosted by the computing system 10, the additional electronic content 16 can include advertisements to be played at certain intervals during commercial breaks in the video file. The video file may include metadata with an instruction to access the advertisements from a server 14 that is an advertisement server. When the video file is played, the computing system 10 can establish a socket connection with the advertisement server to retrieve the advertisements in response to the instruction included in the metadata of the video file.

In the embodiment depicted in FIG. 1, a single server system 14 hosted at the content domain can function as both a policy file server and a socket policy file server. In another embodiment, a policy file server and a socket policy file server can be separate server systems hosted at the content domain. For example, the content server (e.g., ContentServer) and socket policy file server (PolicyFileServer) can be hosted at contentdomain.tld. The computing system can communicate data packets, such as socket policy requests, addressed to "PolicyFileServer.contentserver.tld" via a first secure socket connection. The computing system can communicate data packets, such as requests for electronic content, addressed to "ContentServer.contentserver.tld" via a second secure socket connection.

In additional or alternative embodiments, the computing system 10 can provide access to the electronic content 12 to a client computing system 18 via a network 20. Examples of a client computing system 18 can include, but are not limited to, a desktop computer, a laptop computer, a tablet computer, a smart phone, etc. The client computing system can execute an application 19, such as a rich Internet application, that can execute or otherwise use electronic content 12 hosted by the computing system 10. A rich Internet application can be a web-based application with functionality equivalent to a desktop application. Examples of such functionality include, but are not limited to, features such as context menus, keyboard shortcuts, rich text editors, etc. Examples of rich Internet applications include Adobe® Flash® applications, Microsoft® Outlook® Web Access, Google® Docs®, etc. The electronic content 12 can retrieve additional electronic content 16 from the server 14 in response to input received by the client computing system 18 via the application 19 and provided to the electronic content 12 via the network 20.

For example, a computing system 10 at a network domain, such as hostdomain.tld, may host electronic content 12. The electronic content 12 may include a streaming media server application and a first video file accessed via the streaming media server application. A client computing system 18, such as a tablet computer, may access the streaming media server application to play the first video file using a client application 19, such as an Adobe® Flash® application, that communicates with the streaming media server application. The first video may contain a hyperlink to a related video. The related video may be located at a second network domain, such as contentdomain.tld. While the first video is playing, the Flash application may receive input representing a command to play the related video, such as clicking on the hyperlink. In response to the Flash® application receiving a command to play the related video, the streaming media server application may cause the computing system 10 to retrieve the related video from a server 14 at contentdomain.tld and provide access to the related video by the Flash® application.

Figure 2:
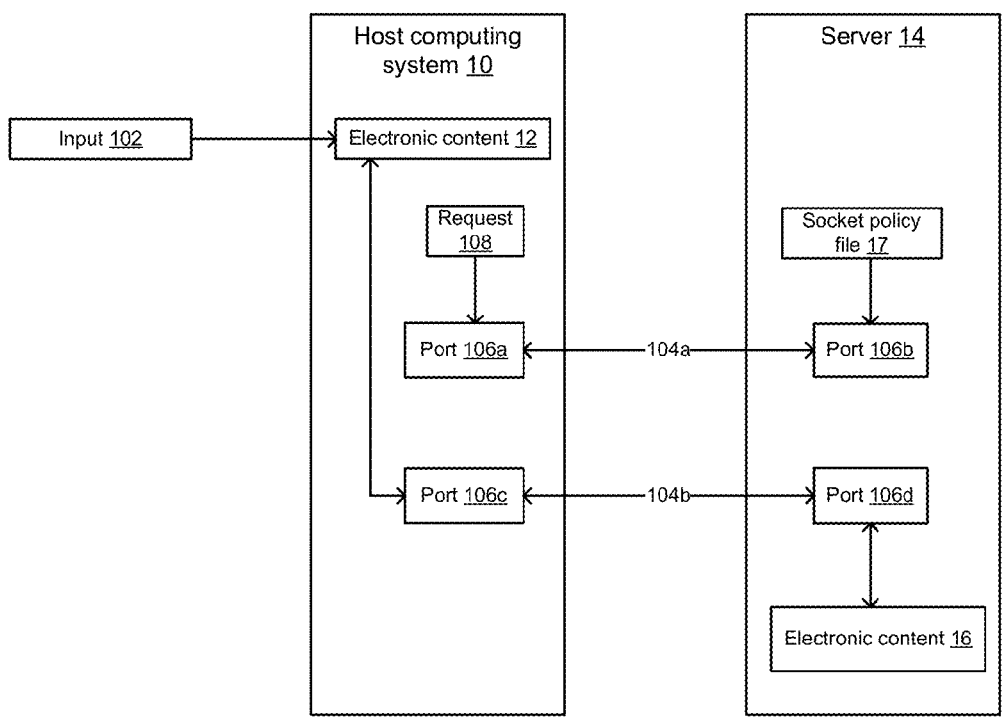
FIG. 2 is a modeling diagram illustrating an exemplary flow of communications between the computing system and the server.

FIG. 2 is a modeling diagram illustrating an exemplary flow of communications between the computing system 10 and the server 14. The electronic content 12 can receive input 102 via network 20 representing a command to execute the additional electronic content 16. The electronic content 12 can cause the computing system 10 to establish a secure socket connection 104a between the computing system 10 and the server 14. The computing system 10 can establish the secure socket connection between a port 106a at the computing system 10 and a port 106b at the server 14.

The secure socket connection 104a can be a data communication channel between the computing system 10 and the server 14 for communicating packetized data using a transport layer protocol. Examples of a transport layer protocol include, but are not limited to, TCP and UDP. Data packets communicated via the secure socket connection 104a can be encrypted using an encryption protocol as specified by the transport layer security protocol.

The computing system 10 can transmit a request 108 for a socket policy file as packetized data. Each of the data packets can include a header addressing the data packets to port 106b. The server can receive the request 108 via port 106b. In response, the server 14 can transmit a socket policy file 17 as packetized data via the secure socket connection 104a. Each of the data packets can include a header addressing the data packets to port 106a. The computing system can receive the socket policy file 17 via port 106a.

Based on the security policy specified in the socket policy file, the computing system 10 can establish a secure socket connection 104b using ports 106c, 106d. The computing system 10 can communicate with the server 14 via the secure socket connection 104b to retrieve the additional electronic content 16. The computing system 10 can transmit packetized data requesting the additional electronic content 16 via the secure socket connection 104b. Each of the data packets can include a header addressing the data packets to port 106d. The server 14 can receive the request for the additional electronic content 16 via port 106d. The server 14 can transmit the additional electronic content 16 as packetized data to the computing system 10. Each of the data packets can include a header addressing the data packets to port 106c. The computing system can receive the additional electronic content 16 and the electronic content 12 can access the additional electronic content 16 at port 106c.

If, however, the security policy specified in the socket policy file does not permit connections from the domain at which the computing system 10 is located, the server 14 can deny requests from the computing system 10 to establish the secure socket connection 104b.

Figure 3:
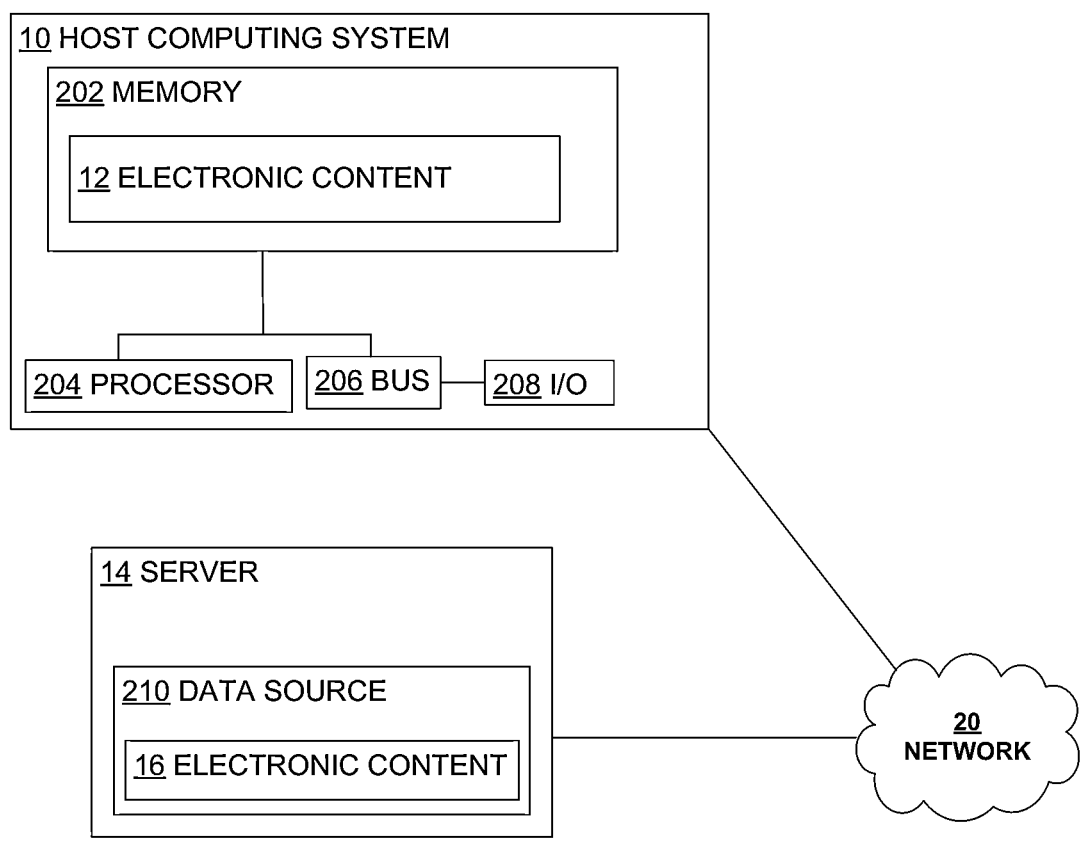
FIG. 3 is a block diagram depicting exemplary computing devices in an exemplary computing environment for implementing certain embodiments.

FIG. 3 is a block diagram depicting exemplary computing devices in an exemplary computing environment for implementing certain embodiments. Electronic content 12 executes or is otherwise used on the exemplary computing system 10 and is shown using functional components or modules. As is known to one of skill in the art, such electronic content may be resident in any suitable non-transitory computer-readable medium and can be executed on any suitable processor.

For example, as shown, an exemplary computing system 10 can include a non-transitory computer-readable medium, such as a random access memory (RAM) 202, coupled to a processor 204 that executes computer-executable program instructions and/or accesses information stored in a memory 202. Such a processor 204 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 204, cause the processor 204 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 10 can receive input and provide output via input/output (I/O) interface 208. I/O interface 208 can include, for example, a network interface for communication via the network 20. A bus, such as bus 206, is included in the computing system 10. Computing system 10 can be any type of computing system included in a network at a domain appropriate for providing one or more of the features described herein.

FIG. 3 illustrates an exemplary computing system 10 that includes, in a memory 202, electronic content 12. The electronic content 12 can configure the processor 204 to retrieve additional electronic content 16 from a data source 210, load the additional electronic content 16 into the memory 202, and provide the additional electronic content 16 via I/O interface 208. The additional electronic content 16 can include, but is not limited to, video files, audio files, image files, and other rich Internet applications. A data source 210 can be any source of data that provides data upon request, pushed data, or otherwise provides data items for use by other applications. In alternative embodiments, the data source 210 may be disposed in the server 14 or be provided from a separate server system or other external location.

Figure 4:
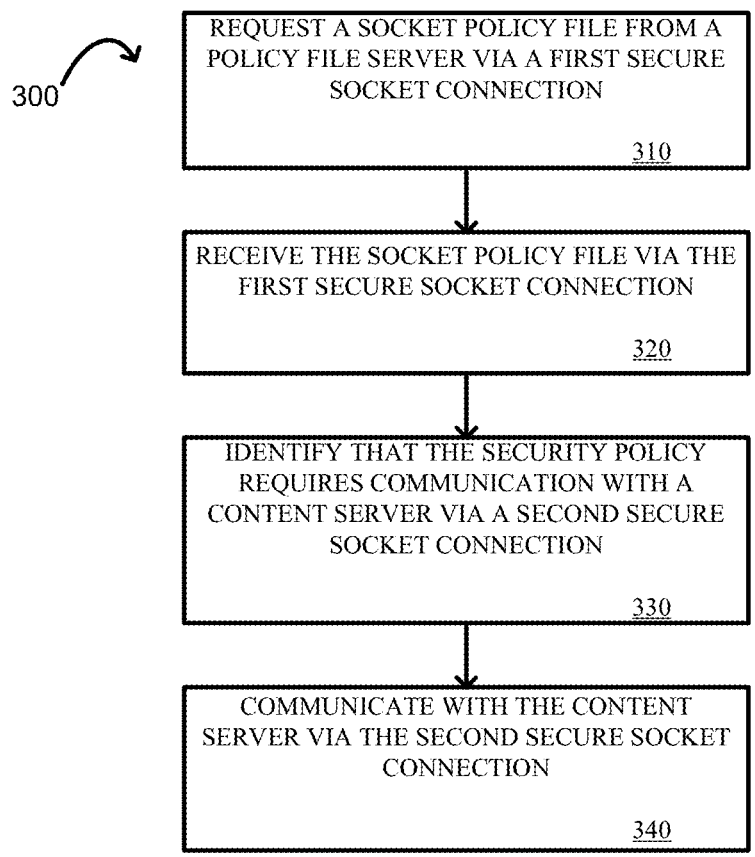
FIG. 4 is a flow chart illustrating an exemplary method for establishing a secure socket connection using a secure socket policy file.

FIG. 4 is a flow chart illustrating an exemplary method 300 for establishing a secure socket connection using a secure socket policy file. For illustrative purposes, the exemplary method 300 is described with reference to the elements of the flow of communications depicted in FIG. 2 and the system implementation depicted in FIG. 3. Other implementations, however, are possible.

The exemplary method 300 involves requesting a socket policy file from a policy file server via a first secure socket connection, as shown in block 310. The policy file server can be the server 14. The electronic content 12, executed or otherwise used at a computing system 10, can configure the processor 204 of computing system 10 to request the socket policy file from the server 14.

In additional or alternative embodiments, the electronic content 12 can initiate the socket policy file request in response to receiving input from an application 19 executed at a client computing system 18. The input from the application 19 can include a command for the electronic content 12 to access additional electronic content 16 hosted by a content server in a domain other than the domain of the computing system 10.

In an exemplary embodiment, the electronic content 12 can generate a data file that includes a request for the socket policy file. The electronic content 12 can configure the processor 204 of the computing system 10 to establish a secure socket connection from port 106a at the computing system 10 to port 106b at the server 14. The secure socket connection can be established using procedures, such as a handshake procedure, specified by a transport layer security protocol. The computing system 10 can transmit the request for the socket policy file as packetized data. The data packets can be encrypted prior to transmission according to an encryption algorithm specified by the transport layer security protocol. The data packets can be addressed to port 106b at the server 14. The server 14 can receive the data packets. The server 14 can decrypt the data packets according to a decryption algorithm specified by the transport layer security protocol. A socket policy file server application executed at the server 14 can access the data packets addressed to port 106b.

In one embodiment, the computing system 10 can establish the first and second secure socket connections using the same port. The computing system 10 can establish the first secure socket connection using port the 106a. The electronic content 12 can terminate the first secure socket connection upon receiving the socket policy file. The computing system 10 can establish the second secure socket connection using the port 106a. In another embodiment, the computing system 10 can establish the first secure socket connection using port 106a and terminate the first secure socket connection upon receiving the socket policy file. The computing system 10 can establish the second secure socket connection using the port 106c that is different than port 106a.

The exemplary method 300 further involves receiving the socket policy file via the first secure socket connection, as shown in block 320. The server 14 can retrieve the socket policy file from a data source 210. The socket policy file can specify a security policy governing socket connections to the server over a transport protocol layer. The security policy can identify one or more domains from which an application is required to communicate using a secure socket connection. The security policy can also specify one or more ports for establishing the secure socket connection. If the security policy specified in the socket policy file does not permit connections from the domain at which the computing system 10 is located, the server 14 can deny requests from the computing system 10 to establish the secure socket connection 104b. If the security policy specified in the socket policy file does not permit connections from the port on which the computing system 10 is attempting to establish a secure socket connection 104b, the computing system 10 can establish a secure socket connection 104b from the port specified in the socket policy file.

The security policy can additionally or alternatively identify one or more additional domains with which a computing system 10 can communicate via a non-secure socket connection. For example, a socket policy file governing communications with the domain contentdomain.tld can specify that the domains securehost.tld and nonsecurehost.tld can communicate with contentdomain.tld. The socket policy file for contentdomain.tld can further specify that securehost.tld must communicate using a secure socket connection and nonsecurehost.tld can communicate using a non-secure socket connection. For example, a content server at contentdomain.tld can grant a request to establish a non-secure connection from a computing system at nonsecurehost.tld and deny a request to establish a non-secure connection from a computing system at securehost.tld.

The server 14 can transmit the socket policy file as packetized data. The policy file data packets can be encrypted prior to transmission according to an encryption algorithm specified by the transport layer security protocol. The policy file data packets can be addressed to port 106a on the computing system 10. The computing system 10 can receive the data packets. The computing system 10 can decrypt the policy file data packets according to a decryption algorithm specified by the transport layer security protocol.

The exemplary method 300 further involves identifying that the security policy requires communication with a content server via a second secure socket connection, as shown in block 330. In alternative embodiments, the content server can be the server 14 or a separate server system hosted at the same domain as the server 14.

The exemplary method 300 further involves communicating with the content server via the second secure socket connection, as shown in block 340. The electronic content 12 can configure the processor 204 of the computing system 10 to communicate with the content server via the second secure socket connection. Communicating via the second secure connection can include establishing the second secure socket connection. Communicating with the content server can include requesting and receiving additional electronic content 16 from the content server. In one embodiment, the electronic content 12 can terminate the second secure socket connection upon receiving the additional electronic content 16. In another embodiment, the electronic content 12 can maintain second secure socket connection for retrieving additional content in response to input received at the client computing system 18 and provided to the computing system 10.

Figure 5:
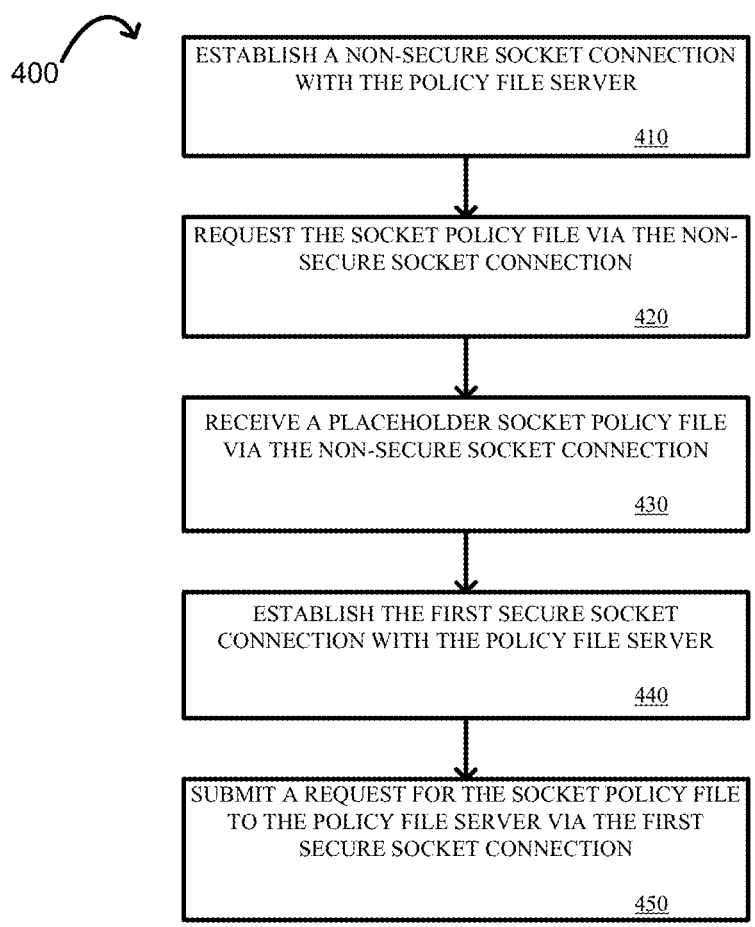
FIG. 5 is a flow chart illustrating an alternative method for requesting a secure socket policy file based on initially receiving a placeholder socket policy file.

FIG. 5 is a flow chart illustrating an alternative method 400 for requesting a secure socket policy file based on initially receiving a placeholder socket policy file. For illustrative purposes, the method 400 is described with reference to the elements of the flow of communications depicted in FIG. 2 and the system implementation depicted in FIG. 3. Other implementations, however, are possible.

The exemplary method 400 involves establishing a non-secure socket connection with the policy file server, as shown in block 410. The electronic content 12 can configure the processor 204 of the computing system 10 to establish a non-secure socket connection from port 106a at the computing system 10 to port 106b at the server 14.

The exemplary method 400 further involves requesting the socket policy file via the non-secure socket connection, as shown in block 420. The computing system 10 can transmit the request for the socket policy file as packetized data addressed to the port 106b without encrypting the data packets. The server 14 can receive the policy file request via the non-secure socket connection. A policy file server application executed at the server 14 can access the policy file request at the port 106b.

The exemplary method 400 further involves receiving a placeholder socket policy file via the non-secure socket connection, as shown in block 430. The policy file server application executed at the server 14 can provide the placeholder socket policy file. The server 14 can transmit the placeholder socket policy file as packetized data addressed to the port 106a without encrypting the data packets. The computing system 10 can receive the placeholder socket policy file.

The placeholder socket policy file can specify that requests for socket policy files from the server 14 must be transmitted via a secure socket connection. In one embodiment, the placeholder socket policy file can specify that the computing system 10 must establish the secure socket connection using a different port than used for the non-secure socket connection. In another embodiment, the placeholder socket policy file can specify that the computing system 10 must establish the secure socket connection using the same port used for the non-secure socket connection.

The exemplary method 400 further involves establishing the first secure socket connection with the policy file server, as shown in block 440. The computing system 10 can establish the secure socket connection as described above with respect to block 310 of the method 300.

The exemplary method 400 further involves submitting a request for the socket policy file to the policy file server via the first secure socket connection, as shown in block 450. The computing system 10 can the submit request for the socket policy file to the policy file server as described above with respect to block 310 of the method 300. The computing system can retrieve the socket policy file and establish a secure socket connection with the content server as described above with respect to 300.

In additional or alternative embodiments, the placeholder socket policy file can specify the domains from which a computing system 10 can request a socket policy file. If the computing system 10 is not located at a domain specified in the placeholder socket policy file, the policy file server may deny further requests for the socket policy file from the computing system 10.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
   establishing, by a computing system, a non-secure socket connection with a policy file server;
   requesting, by the computing system, a socket policy file via the non-secure socket connection;
   receiving, by the computing system, a placeholder socket policy file in response to said request via the non-secure socket connection, wherein the placeholder socket policy file specifies to request the socket policy file via a first secure socket connection;
   in response to said receiving the placeholder socket policy file, establishing, by the computing system, the first secure socket connection with the policy file server;
   requesting, by the computing system configured by media content, the socket policy file from the policy file server via the first secure socket connection, wherein the socket policy file specifies a security policy governing socket connections for accessing additional media content on a content server over a transport protocol layer, wherein the security policy identifies (i) domains from which secure socket connections are required to communicate with the content server and (ii) domains from which non-secure socket connections are permitted to communicate with the content server;
   receiving, by the computing system, the socket policy file via the first secure socket connection;
   identifying, by the computing system, that the security policy requires communication with the content server via a second secure socket connection; and
   communicating, by the computing system, with the content server via the second secure socket connection to access the additional media content.

2. The method of claim 1, wherein the socket policy file is requested based on receiving, by an application executed at the computing system, input representing a command to execute media content hosted on the content server.

3. The method of claim 1, wherein the policy file server and the content server are comprised in a single server system.

4. The method of claim 1, wherein the policy file server is comprised in a first server system, the content server is comprised in a second server system, and the first server system and the second server system are hosted on a common network domain.

5. The method of claim 1, further comprising:
said establishing, by the computing system, the first secure socket connection using a port, wherein the port comprises a socket connection end point for communicating with a server;
terminating, by the computing system, the first secure socket connection upon receiving the socket policy file; and
establishing, by the computing system, the second secure socket connection using the port.

6. The method of claim 1, further comprising:
said establishing, by the computing system, the first secure socket connection using a first port;
terminating, by the computing system, the first secure socket connection after receiving the socket policy file; and
establishing, by the computing system, the second secure socket connection using a second port.

7. The method of claim 1, wherein the socket policy file is an Extensible Markup Language (XML) file.

8. A computing system comprising:
a processor for executing instructions stored in a computer-readable medium on one or more devices providing an application;
wherein the application comprises one or more modules configured to perform operations when the computing system is configured by media content, the operations comprising:
establishing a non-secure socket connection with a policy file server;
requesting a socket policy file via the non-secure socket connection;
receiving a placeholder socket policy file in response to said request via the non-secure socket connection, wherein the placeholder socket policy file specifies to request the socket policy file via a first secure socket connection;
in response to said receiving the placeholder socket policy file, establishing the first secure socket connection with the policy file server;
requesting the socket policy file from the policy file server via the first secure socket connection, wherein the socket policy file specifies a security policy governing socket connections for accessing additional media content on a content server over a transport protocol layer, wherein the security policy identifies (i) domains from which secure socket connections are required to communicate with the content server and (ii) domains from which non-secure socket connections are permitted to communicate with the content server;
receiving the socket policy file via the first secure socket connection;
identifying that the security policy requires communication with the content server via a second secure socket connection; and
communicating with the content server via the second secure socket connection to access the additional media content.

9. The computing system of claim 8, wherein the one or more modules are configured to perform additional operations comprising:
said establishing the first secure socket connection using a port, wherein the port comprises a socket connection end point for communicating with a server;
terminating the first secure socket connection upon receiving the socket policy file; and
establishing the second secure socket connection using the port.

10. The computing system of claim 8, wherein the one or more modules are configured to perform additional operations comprising:
said establishing the first secure socket connection using a first port;
terminating the first secure socket connection upon receiving the socket policy file; and
establishing the second secure socket connection using a second port.

11. A computer-readable medium stored on a storage device, the computer-readable medium embodying program code executable by a computer system configured by media content, the computer-readable medium comprising:
program code for establishing a non-secure socket connection with a policy file server;
program code for requesting a socket policy file via the non-secure socket connection;
program code for receiving a placeholder socket policy file in response to said request via the non-secure socket connection, wherein the placeholder socket policy file specifies to request the socket policy file via a first secure socket connection;
program code for establishing, in response to said receiving the placeholder socket policy file, the first secure socket connection with the policy file server;
program code for requesting the socket policy file from the policy file server via the first secure socket connection, wherein the socket policy file specifies a security policy governing socket connections for accessing additional media content on a content server over a transport protocol layer, wherein the security policy identifies (i) domains from which secure socket connections are required to communicate with the content server and (ii) domains from which non-secure socket connections are permitted to communicate with the content server;
program code for receiving the socket policy file via the first secure socket connection;
program code for identifying that the security policy requires communication with the content server via a second secure socket connection; and
program code for communicating with the content server via the second secure socket connection to access the additional media content.

12. The computer-readable medium of claim 11, further comprising:
program code for said establishing the first secure socket connection using a port, wherein the port comprises a socket connection end point for communicating with a server;
program code for terminating the first secure socket connection upon receiving the socket policy file; and
program code for establishing the second secure socket connection using the port.

13. The computer-readable medium of claim 11, further comprising:
program code for said establishing the first secure socket connection using a first port;

program code for terminating the first secure socket connection upon receiving the socket policy file; and program code for establishing the second secure socket connection using a second port.

* * * * *